United States Patent
Bächli

(10) Patent No.: US 11,067,099 B2
(45) Date of Patent: Jul. 20, 2021

(54) METHOD AND SYSTEM FOR COMBINED PUMP WATER PRESSURE-COMPRESSED AIR ENERGY STORAGE AT CONSTANT TURBINE WATER PRESSURE

(71) Applicant: EMIL BÄCHLI ENERGIETECHNIK AG, Endingen (CH)

(72) Inventor: Emil Bächli, Endingen (CH)

(73) Assignee: EMIL BÄCHLI ENERGIETECHNIK AG, Endingen (CH)

( * ) Notice: Subject to any disclaimer, the term of this patent is extended or adjusted under 35 U.S.C. 154(b) by 27 days.

(21) Appl. No.: 15/024,208

(22) PCT Filed: Sep. 25, 2014

(86) PCT No.: PCT/EP2014/002600
§ 371 (c)(1),
(2) Date: Apr. 28, 2016

(87) PCT Pub. No.: WO2015/043747
PCT Pub. Date: Apr. 2, 2015

(65) Prior Publication Data
US 2016/0348637 A1    Dec. 1, 2016

(30) Foreign Application Priority Data
Sep. 25, 2013    (CH) ........................... 1642/13

(51) Int. Cl.
F15B 1/02    (2006.01)

(52) U.S. Cl.
CPC ...... *F15B 1/024* (2013.01); *F15B 2201/4053* (2013.01)

(58) Field of Classification Search
CPC .............. F15B 1/024; F15B 2201/4155; F15B 2201/205; F15B 2211/4053
See application file for complete search history.

(56) References Cited

U.S. PATENT DOCUMENTS

| | | | | |
|---|---|---|---|---|
| 3,091,258 A | * | 5/1963 | Marette | ..................... F15B 1/16 138/30 |
| 4,055,950 A | * | 11/1977 | Grossman | ................. F04B 7/04 290/55 |

(Continued)

FOREIGN PATENT DOCUMENTS

| | | |
|---|---|---|
| DE | 102007062502 A1 | 6/2009 |
| DE | 102011106040 A1 | 12/2012 |

(Continued)

OTHER PUBLICATIONS

International Search Report for PCT/EP2014/002600 dated Jan. 13, 2015.

*Primary Examiner* — F Daniel Lopez
(74) *Attorney, Agent, or Firm* — Bachman and Lapointe PC; George Coury

(57) ABSTRACT

A method for the combined pump water pressure-compressed air energy storage at a constant turbine water pressure, the energy to be stored is used to pump a liquid medium into a pressure vessel such that a rising level of medium compresses the gas contained in the pressure vessel through a connecting conduit and presses said gas into a compressed gas tank, the conduit being shut using a check valve such that the energy is stored in the compressed gas.

9 Claims, 9 Drawing Sheets

(56) References Cited

U.S. PATENT DOCUMENTS

| | | | |
|---|---|---|---|
| 4,206,608 A | | 6/1980 | Bell |
| 4,358,250 A | * | 11/1982 | Payne .................. F04B 9/1273 417/302 |
| 4,606,376 A | * | 8/1986 | Bernard .................. F15B 1/08 138/26 |
| 6,718,761 B2 | * | 4/2004 | Merswolke ............ F03D 9/008 60/398 |
| 2012/0047884 A1 | * | 3/2012 | McBride .................. F03G 6/00 60/327 |

FOREIGN PATENT DOCUMENTS

| | | |
|---|---|---|
| DE | 102012015732 A1 | 2/2013 |
| WO | 2011101647 A2 | 8/2011 |

\* cited by examiner

METHOD AND SYSTEM FOR COMBINED PUMP WATER PRESSURE-COMPRESSED AIR ENERGY STORAGE AT CONSTANT TURBINE WATER PRESSURE

BACKGROUND OF THE INVENTION

The invention relates to a method for combined pump water pressure—compressed air energy storage at constant turbine water pressure, and to a system therefor.

The globally increasing utilization of solar and wind energy for generating electric power has the disadvantage that said energy is available at irregular intervals and specifically not always when said energy is required. There is an absence of a cost-effective storage possibility having a good degree of efficiency and long service life, as well as being environmentally friendly.

Storage technologies to date do not yet adequately meet these requirements, with the exception of the reservoir lakes in the Alps, the expansion plans of which are however impeded on an ongoing basis by nature conservation. At present, pump water energy storage having high-altitude reservoir lakes is the most efficient type of energy storage.

Since there are few possibilities for establishing high-altitude reservoir lakes and the latter cause administrative appeals on an ongoing basis, the question whether there is no other possibility of generating water pressure even without reservoir lakes arises. This possibility does exist and has already been implemented for decades in the so-called domestic water pumps. However, the latter are of no economic significance.

DE 10 2012 015 732 A1 discloses a method for combined pump water pressure—compressed air energy storage at constant turbine water pressure, wherein a liquid medium, in particular water, is pumped with the energy to be stored into a pressure-tight and air-tight cavity, in particular into a pressure vessel, such that an increasing medium level in a piston-like manner compresses the gas located in the pressure vessel until the medium fills the cavity, presses said gas through a connection line into a compressed-gas vessel and shuts off said gas by way of a stop valve such that the energy is stored in the compressed gas. A constant turbine water pressure here is achieved in that the storage for the gas is dimensioned so as to be much larger than the pressurized water vessel, and that the pressure differential is as large as possible. The pressure of the gas will thus remain almost constant when the water is discharged.

A method for combined pump water pressure—compressed air energy storage at constant turbine water pressure is likewise known from WO 2011/101647 A2, wherein here a constant turbine water pressure is additionally achieved in that the gas is present in two phases—in the liquid phase and in the gaseous phase, wherein the evaporation pressure is constant and a constant gas pressure therefore also acts on the water.

It is the objective of the present invention to develop a storage system which meets the above-mentioned requirements as well as the desires of nature conservation.

SUMMARY OF THE INVENTION

The object is achieved by the method and the system of the present invention as will become evident from the following description.

Preferably water, or else any other liquid medium, may be pumped by a pump driven by an electric motor into a pressure-tight vessel which is filled with air or an equivalent gas. The steadily rising water level continuously compresses the elastic air in the vessel, such that the air pressure and thus the water pressure steadily rise. The water pressure is stored when the pump is automatically switched off upon reaching a specific pressure level.

The electrically driven pump has thus converted the electrical energy to potential water-pressure energy. By pumping water against an air cushion in a tightly closed vessel, such as implemented in the domestic water pump, energy may thus be stored with the aid of the air cushion, and pumping up water in or to generate pressure may thus be simulated, that is to say substituted. However, this has the great disadvantage that the water pressure during the discharge of water from the pressure vessel, for example for driving a turbine, would steadily decrease. This constitutes a large issue for converting potential water-pressure energy to electrical energy.

The present invention has the objective of eliminating this issue and to keep the water pressure for conversion of potential energy to electrical energy constant at the same pressure level even in the air-cushion pump water energy storage system.

According to the invention, this is achieved in that the pressure vessel is tightly subdivided by a pressure-tight intermediate wall, for example, having half the volume as part for the water and half of the volume as part for the air, for example. The two vessel parts are interconnected by two communicating lines, the first line having a closable valve, and the second line having two stop valves having an interdisposed air-pressure reducing valve.

Prior to the commencement of energy storage, the air is precompressed in both vessel parts, for example to 50 bar, while the first valve is open. Subsequently, the larger vessel part having the electrical energy to be stored by means of a pump is pumped full with water. At a rising pressure of initially 50 bar, the rising water level in the manner of a piston pushes the air completely into the small air vessel and there, on account of the diminished volume, reaches a pressure of approx. 200 bar.

When filling with water is terminated, the first valve closes the connection between the water vessel and the air vessel. The electrical pumping energy is thus converted to potential air-pressure energy and is stored at approx. 200 bar air pressure in the small air vessel. Air turbines have a poor degree of efficiency for energy recuperation, which is why the compressed air according to the inventive concept is converted to a reduced and constant water pressure. The latter is reduced to approx. 50 bar. This is achieved by way of a gas-pressure reducing valve which is fitted between the two stop valves and which enabling air circulation connects the small air-pressure vessel to the large water vessel. The input-side air pressure at the reducing valve is initially 200 bar and on the operation side is set to 50 bar. Upon commencing operation of the water turbine for energy recuperation, the water level in the large water vessel steadily decreases, and the air pressure inevitably sinks too. The latter is however continuously readjusted by air flowing in from the reducing valve which is set to 50 bar such that up to a residual amount the entire amount of water in the water pressure vessel at a constant water pressure of 50 bar drives the water turbine having a generator at a higher degree of efficiency than would be possible in a direct manner using compressed air via a gas turbine.

Using this solution, maintaining constant water pressure of reservoir lake power stations is more likely to be exceeded, the water pressure of the latter on account of the height of the dam wall varying in the case of an empty or a full reservoir lake.

The regulation of the amount of water is integrated in the turbines, for example by way of readjusting the needle valves in Pelton turbines.

In the present storage method according to the invention, there are no energy-destructive air heating issues such as in the case of compressed-air energy storage systems, not least as a result of the high air turbulence up to 1000° C. in piston-type compressors and turbo-compressors, since the air is not compressed by turbulences in fast-running piston blades and turbine blades but is rather compressed in a very calm manner by the slowly rising water level in the pressure vessel. The contact area between water and air is very large such that the heated air created by compression is immediately cooled by the water. An additional cooling possibility for the air being heated lies in that the supply of water to the water pressure vessel is not performed from below but from above by way of a perforated pipe, such that the water pumped in trickles through the air being heated and cools the latter. A little water may also be atomized in order for the air being heated to be cooled.

This combined pump water pressure—compressed air energy storage at constant turbine water pressure, having degrees of efficiency of up to 80%, is far superior to the new research projects relating to compressed-air energy storage technology having a heat store and heat recuperation with a desired degree of efficiency of 70%, also in economic terms, since water turbines and water pumps having degrees of efficiency of more than 90% are more cost-effective than turbo-compressors and gas turbines having a significantly poorer degree of efficiency. Moreover, the high costs of a heat store up to 600° C. and having a pressure-tight insulation up to 100 bar, which is still very complex to develop, may be saved.

The storage capacity of the pump water pressure—compressed air storage system having constant turbine water is impressive. An electricity storage capacity of approx. 30 kWh results in the case of concrete-reinforced high-pressure pipes with a capacity of 2000 l and of compressed air of 1000 bar.

Upon termination of energy recuperation the initial compression of air at the stationary pressure of precompression of 50 bar is reinstated at 50 bar in both pressure vessels. Precompression has the advantage that water does not have to be pumped starting from atmospheric pressure in the case of every storage cycle.

Advantageously, a residual amount of water always remains in the pressurized water vessel, in order for the stationary air pressure of 50 bar, for example, to be maintained.

The height of precompression of the air in the pressure vessels and the subsequent operating pressure in bar depends on the pressure tightness of the vessel. The higher the pressure and the larger the vessel volume, the more energy may be stored. The pressure tightness of the pressure vessels must correspond to approx. double the maximum operating pressure and may be periodically monitored by way of a simple water pressure test.

The size ratio of the water pressure vessel to the air pressure vessel also determines the air pressure. For example, if the water pressure vessel is of the same size as the air pressure vessel, the pressure in the latter doubles, from 50 to 100 bar.

Using a liquid pressure reducing valve installed upstream of the water turbine, this pressure reduction to 50 bar would also be possible, however, the water pressure energy stored above 50 bar would be completely lost since the volume of water cannot be increased by a reduction in pressure, as is the case with air.

The environmentally friendly storage system which is not visible in the ground or in water or in rock tunnels is also not exposed to administrative appeals like reservoir lakes. Savings can be made in terms of entire or partial planned high-voltage lines by building these stores at all neuralgic points having excessive electrical power or a deficit of electrical power.

As has already been mentioned above, in order to save stored water in areas experiencing a shortage of water, two storage systems may also be built next to one another, alternating the stored water from one system to another. The water from the one system that is freed up by way of energy recuperation simultaneously serves for energy storage in the other system. An impressive saving in water results therefrom. An equalizing reservoir between both systems ensures that there is always a sufficient amount of water. A large water tank for the total amount of water may be saved on account of this dual operation. The advantage of this alternating operation also lies in that switching over from storage to storage recuperation can be very rapidly performed. More than two systems may also be combined with one another for this alternating storage operation.

Here too, the air is precompressed in both vessel parts prior to the commencement of energy storage, for example to 50 bar. No air compressor is needed for this compression; savings may be made for the former in that the air is compressed using the water piston system according to the present invention at a much higher degree of efficiency and without issues relating to heated air. In order for this to be achieved, the empty pressurized water vessel is pumped full with water, and the air is pressed into the compressed air vessel by way of an opened stop valve.

In the case of a full water vessel the stop valve to the compressed air vessel is closed. Since the required pressure in the air vessel has not yet been reached by one water piston stroke, the water pumping procedure has to be repeated. For this purpose, the water in the water vessel that is separated from the compressed air vessel by a stop valve is discharged by way of an opened stop valve through a connection pipe to the pressureless water reserve vessel. This water is again pumped into the same pressurized water vessel and the air by the increasing water level is pressed in a piston-like manner into the air vessel. This is repeated so often until the envisaged air pressure has been reached. Since the preliminary pressure in the empty pressurized water vessel and the compressed air vessel is to be 50 bar, the air in the pressure vessel first has to be compressed to double the pressure, that is to say to 100 bar. By opening the stop valve to the previously emptied water vessel, compressed air at 100 bar streams into the latter such that the compressed air in both vessels adjusts to 50 bar.

In the energy storage system according to the invention the achievable amount of stored energy depends not only on the size of the sealed and pressure-tight cavities or pressure containments but also on the achievable pressure tightness. According to the prior art, in the case of disused mines and rock tunnels 50-100 bar are expected, in the case of standard pipeline pipes having a diameter of 1 m up to 200 bar, especially up to 300 bar are expected. Using concrete steel reinforced storage pipes according to the invention, pressure tightness values well beyond 1000 bar are implementable, the rated pressure tightness having to reach double that value. These high pressures will not represent any safety problem for energy storage, since industry in thousands of systems for other purposes operates with water at up to 4000 bar, and high-pressure washers with up to 1000 bar are also in use. High-pressure water pumps with up to 4000 bar, having degrees of efficiency of more than 90% are also commercially available.

In order to drive the turbine at a water pressure of 50 bar according to the invention, having for example 1000 bar storage pressure and by means of an air-pressure reducing valve, approximately ten times the amount of water of the contents of the compressed-air store of 1000 bar is required. Having a compressed-air store size of 1200 liters, for example, a pressurized water store having approx. 12,000 liters capacity would have to be available, which is very uneconomical.

It is also an object of this invention to find a solution in order to reduce the amount of water from 12,000 liters at 50 bar to 1200 liters 50 bar+approx. 2000 liters at zero pressure. This is achieved in that using two water vessels, preferably of identical capacity and identical pressure tightness as the compressed air vessel, the one water vessel at an air pressure of 50 bar alternatingly drives the turbine with pressurized water at a constant pressure of 50 bar, while the other vessel, the water vessel, which from previously having fed the turbine is almost devoid of water is simultaneously filled by means of pumps with water from the pressureless water vessel. On account of the water-filling by pump, the preliminary air pressure of 50 bar in the empty water vessel in a piston-like manner is recuperated by opening the valve on the compressed air vessel, and no losses are incurred in this way. On account of this alternating and revolving operation and on account of the turbine waste water being recycled, an infinite amount of pumped water is made available from the pressureless water vessel of approx. 2000 liters capacity.

Using pressure vessels that are 100% air-tight, energy storage without losses is possible for months, in contrast to battery storage where continuous standby losses are incurred. Moreover, water as a storage medium is infinitely more environmentally friendly than the toxic materials in the batteries.

The pressure vessels are the main component part of the new storage system, the former being many times more durable than battery storage, this having a positive effect on the storage costs per kWh.

The components required for overpressure protection and charging and discharging of the energy storage and for regulating the amounts of water, for regulating the revolutions and the output of the turbine by means of valves, and all control and monitoring elements are computer controlled and process controlled. Overpressure protection is ensured by at least to independent systems. By way of an emergency switch the air in the compressed air vessel may be immediately vented in an upward manner through a valve with a pipe and the system may be rendered pressureless within a short time without emptying the water, such that dangerous flooding catastrophes as in the case of a burst dam wall are excluded.

A water stop valve is attached to the exit opening of the water pressure vessel such that no water from the water pressure vessel may reach the compressed air vessel. A check valve is advantageously fitted to the entry of the pressurized pump water into the pressurized water vessel.

In order for pump water pressure—air cushion energy storage to be implemented, most of the components such as pumps, turbines, generators, protection elements, grid adaptors, etc. have already been developed and are already prior art in the reservoir lake power stations. Said components may be adopted by way of adaptations of size and output. By contrast, storage water vessels for very high pressures, which are to replace reservoir lakes to a smaller scale, are an issue which has yet to be solved. It is an object of this invention to develop solutions for high-pressure vessels that are as cost-effective as possible, or to find suitable and quite dissimilar technical applications for the present energy storage and to apply the latter thereto.

In principle, tubular vessels, that is to say stainless steel pipes which are tightly closed at both ends are best suited to high pressures. The larger the pipe diameter, the larger the wall thickness thereof has to be. However, stainless steel pipes having thick walls are very expensive. Therefore, it is proposed that thin-walled pipes are to be enclosed using steel-reinforced special concrete and to reinforce said pipes in this way, since reinforcement steel is approx. 6× cheaper than stainless steel. Depending on the required pressure tightness, helically coiled reinforcement steel is pushed in one or a plurality of layers over the pipe to be reinforced, so as to eliminate the radial pressure presses. In order for the axial pressure presses to be eliminated, the two pipe terminal closures are interconnected by means of reinforcement steel. They are longitudinally disposed in an annular manner on the circumference of the pipe, so as to be between the tubular and the helical reinforcements, and are fixedly welded to the tight pipe terminals. Using this construction, high-pressure vessels having a small pipe diameter may be implemented having a pressure-tightness of more than 1000 bar. One or a plurality of interconnected pipes which have been steel-reinforced in such a manner are provided with a casing and embedded in high-pressure-tight concrete. Storage pipes which are enclosed in a pressure-tight reinforced concrete jacket are particularly well protected against corrosion, be it for installation in the ground or in water. A potential service life of more than 60 years results in economical, cost-effective energy storage.

The storage pipes may not only be placed in a horizontal manner but also in a vertical manner in a earth bore hole or else in disused ore or coal mines, etc., or else in tunnels or shafts.

The pressure-tightness of the storage pipes may be checked at any time using a normal water pressure testing apparatus. Pipes from a completely different technical application, specifically from gas and oil pipelines, are very well suited as high-pressure storage pipes. Such pipes have a pressure-tightness of up to 200 bar. Having a diameter of up to more than one meter, even comparatively large air cushion—pump water energy storage may be implemented.

Long-term experience has already been gained with pipelines for gas and oil that have been installed underground or on the seabed. Such experience is very important and valuable in the reassigned use of these pipeline pipes in water pressure energy storage. On account of said pipes having proven successful in terms of corrosion in sea water, pump stores may also be implemented without hesitation underwater at beaches in order to store wind power, for example. Vacated tunnels and shafts, and disused mines, etc., to the extent that the latter cannot be rendered air-tight, may be with pipeline pipes which are closed at the ends, placed therein and used as air cushion—water pressure energy storage.

In order to save weight, for example for energy storage for vehicles, fiber-reinforced plastics may also be used as a pressure vessel. Disused tunnels or the construction of new tunnels, for example in compact granite or lime rock, having a rock cover of several hundreds of meters, are also suitable for large energy storage volumes. The internal faces of the tunnel are to be sealed using an air-tight coating. The separate air pressure store by means of a pipeline pipe which has been closed at the ends, for example, may be longitudinally placed in the water-filled tunnel.

The new energy storage according to the present invention results in surprising improvements in the degree of efficiency and in massive cost reductions in wind power systems by way of a force-fitting direct drive, of the propeller by means of an angular gear via a shaft to the high-pressure water pump for energy storage. The direct path from the propeller to the high-pressure water pump, while eliminating the generator producing electrical power and the pump drive motor, first results in an improvement of the degree of efficiency of approx. 20% and, second, results in a reduction of costs for the construction of wind power systems that has not been considered possible. This saving is approx. ⅓ of the total cost of a wind turbine. Without the generation of any electrical power and without complicated electronic frequency stabilizing installations on the high tower and expensive maintenance costs: all this is no longer required.

Moreover, using a high-pressure piston water pump has the advantage that the former has the same high degree of efficiency above 90% at each revolution, be it high or low. This has the advantage that the usual stabilization of the revolutions of a propeller is dispensed with, corresponding to a further reduction in costs.

A further cost advantage is created in that the wind turbine stands directly above the subterranean concrete construction of the storage system, and that this concrete construction serves as a foundation, such that savings can be made in terms of a usual foundation for the tower of a wind turbine. Moreover, the pressure-tight cavity of the tower may be utilized for storing pressurized water or compressed air.

Using this innovation, wind energy can be expected to assume the position of the most cost-effective generation of electrical power by far, even having the advantage that electrical power may also be generated by way of the associated energy storage during a lull. The cost savings when setting up new wind power systems according to the invention without a generator and without electronics is in the magnitude that the storage may be partly or completely financed thereby.

By constructing wind power systems having the new energy storage a further great advantage of stabilizing the grid is created, such that new high-voltage lines may be partly or completely dispensed with.

The new pump water pressure—compressed air storage according to the invention, having a degree of efficiency of approx. 80% has the advantage that the turbine water pressure during energy recuperation always remains constant at the same level, regardless of whether there is strong or weak wind, or no wind at all.

Instead of an individual wind turbine having associated storage, it may be advantageous to assemble a group of wind turbines without a generator, each being equipped only with a high-pressure pump and communicating with a central energy storage.

BRIEF DESCRIPTION OF THE DRAWINGS

Further advantages, features, and details of the invention are derived from the following description of preferred exemplary embodiments and by means of the drawing in which.

DETAILED DESCRIPTION

Figure 1:
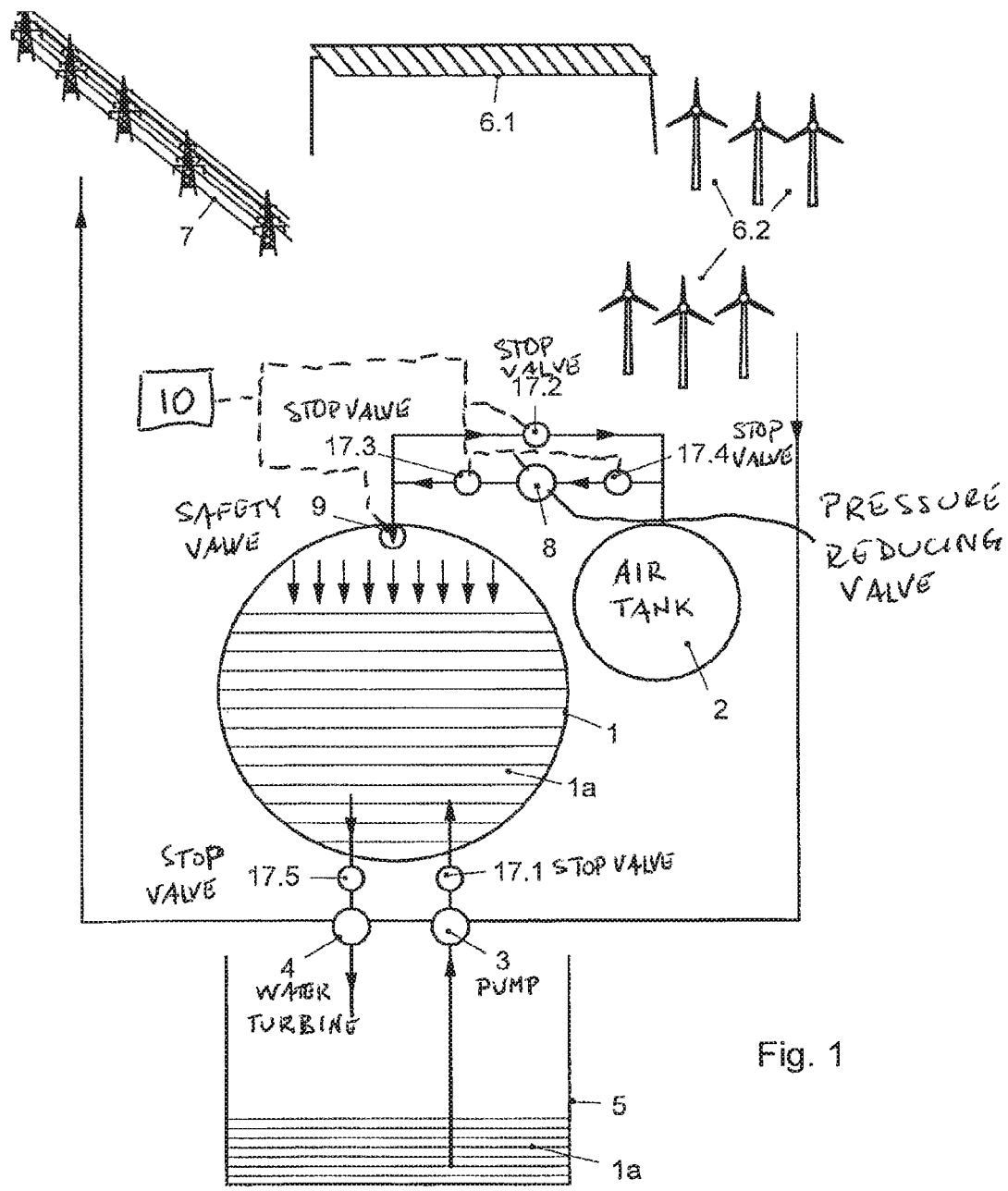
FIG. 1 shows a schematic illustration of energy storage according to the invention of wind energy, solar energy, or other irregularly occurring energy types.

According to FIG. 1, storage water $1a$ is located in a pressurized water vessel 1. This storage water $1a$ is fed into the pressurized water vessel 1 by means of a high-pressure water pump 3, having a motor, via a stop valve 17.1.

The respective energy for the high-pressure water pump 3 is made available by a solar panel 6.1 or a wind farm 6.2.

The pressurized water vessel 1 is connected to a compressed air vessel 2, so as to communicate with the latter and to be separable therefrom. To this end, respective valves are interdisposed in the respective lines. A water stop safety valve 9 which guarantees that no water but only air reaches the compressed air vessel 2 is located in the line near the pressurized water vessel 1. Thereafter, a further stop valve 17.2 follows toward the compressed air vessel 2. A compressed-air reducing valve 8 is provided in a return bypass, stop valves 17.3 and 17.4 being likewise assigned to either side of said valve 8. Relief valves are referenced with 23.

Using the storage water $1a$ from the pressurized water vessel 1, a water turbine 4 having a generator may be supplied by way of a stop valve 17.5, again in a separable manner. The respective energy generated is fed into a grid 7.

The mode of operation of the present invention is as follows, for example:

Water from a water vessel 5 is pumped by means of an electrically driven high-pressure pump 3 into a pressurized water vessel 1 having precompressed air at 50 bar. The pressurized water vessel 1 is connected to the compressed air vessel 2 so as to communicate with the latter and be separable therefrom, the air in the pressurized water vessel being displaced by the water filling being pressed into said compressed air vessel 2. If the volume in the compressed air vessel 2 is four times smaller than the volume in the pressurized water vessel 1, the pressure in the compressed air vessel 2 increases to 4×50=200 bar. By closing a valve 17.2 the energy is stored in the small compressed air vessel 2 having compressed air at 200 bar. Since an operating water pressure of the turbine is 50 bar, for example, the compressed air at 200 bar by way of a compressed-air reducing valve 8 is adjusted to an operating pressure of 50 bar.

By opening two stop valves 17.3 and 17.4 the compressed air at 200 bar flows through the reducing valve 8 at 50 bar and into the water-filled pressurized water vessel 1, such that the entire amount of water up to a residual amount of water drives the turbine at a constant pressure of 50 bar. The sinking water level in the pressurized water vessel 1 in conjunction with the sinking air pressure is continuously readjusted to 50 bar by the pressure reducing valve 8 which is set to 50 bar.

Figure 2A:
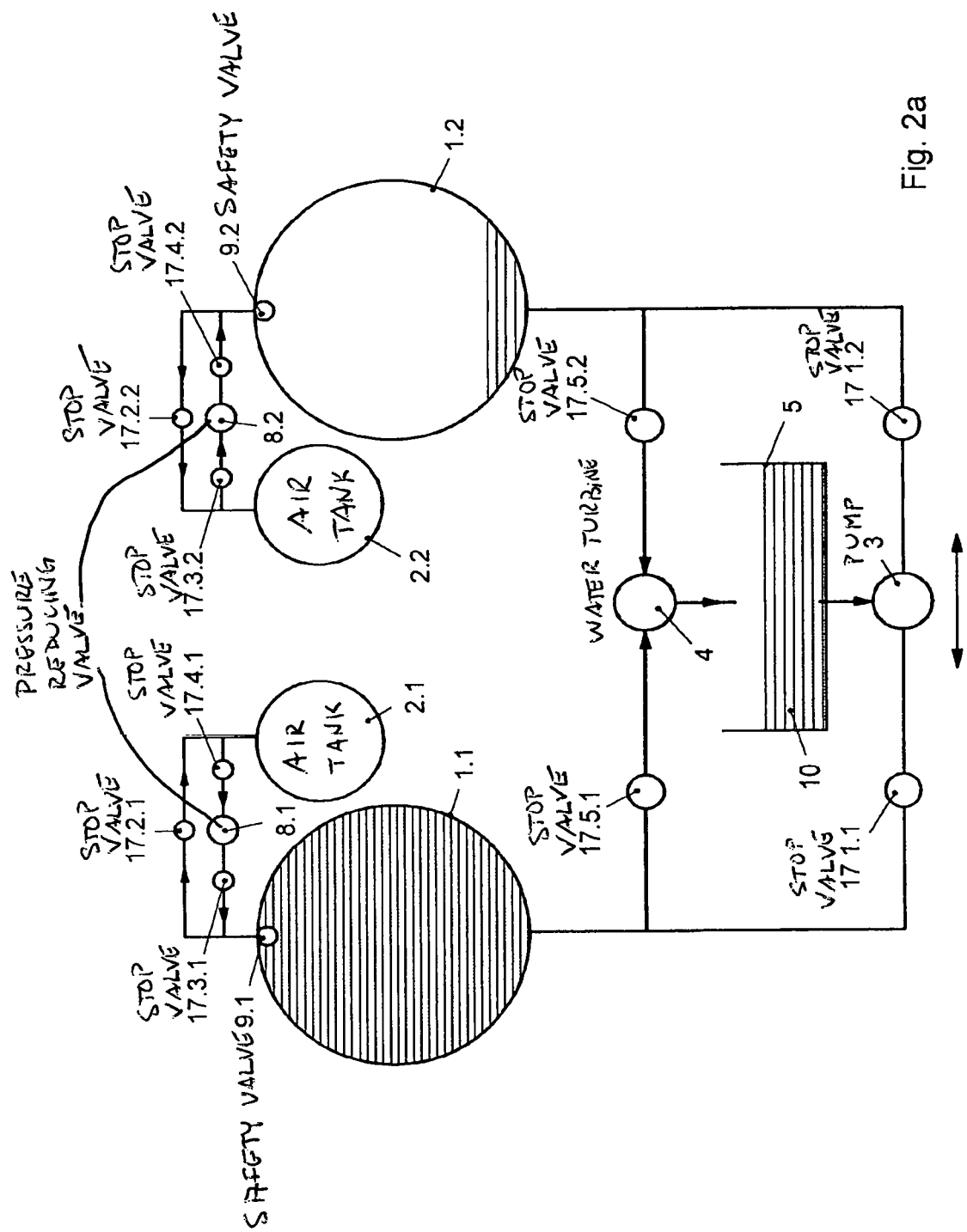
FIGS. 2a and 2b show schematic illustrations of in each case one embodiment of energy storage according to the invention in an alternating operation of two storage systems.
Figure 2B:
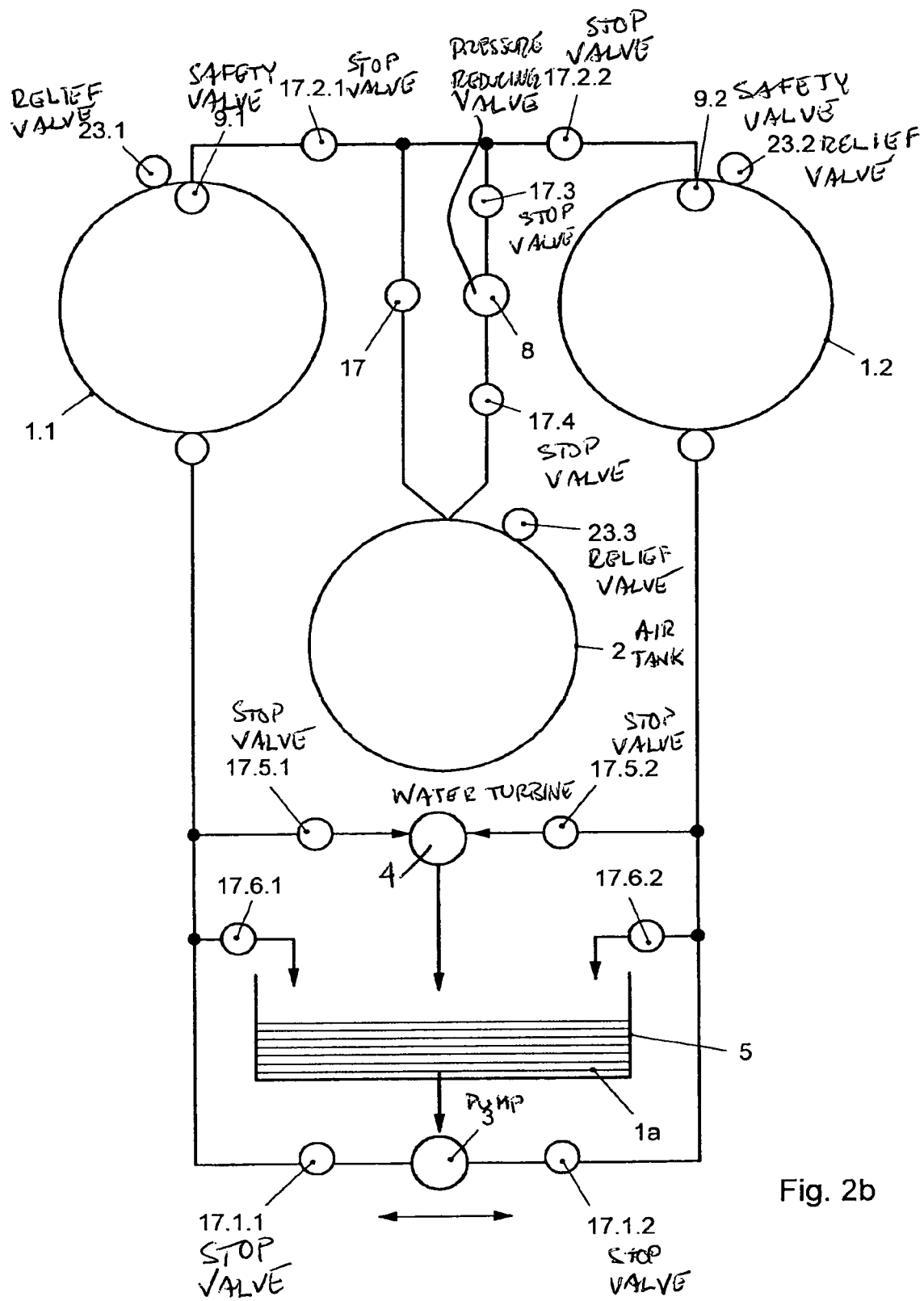

According to FIG. 2, energy storage according to the invention is illustrated in an alternating operation of two storage systems 1.1 and 1.2. While water is being pumped into the system 1.1 on the left for energy storage, the system 1.2 on the right, in which energy is being recuperated, now releases water which is required by the system on the left. A common water equalizing basin 5 ensures that there is always sufficient water available. A large water basin for the entire amount of water may be dispensed with.

Figure 3:
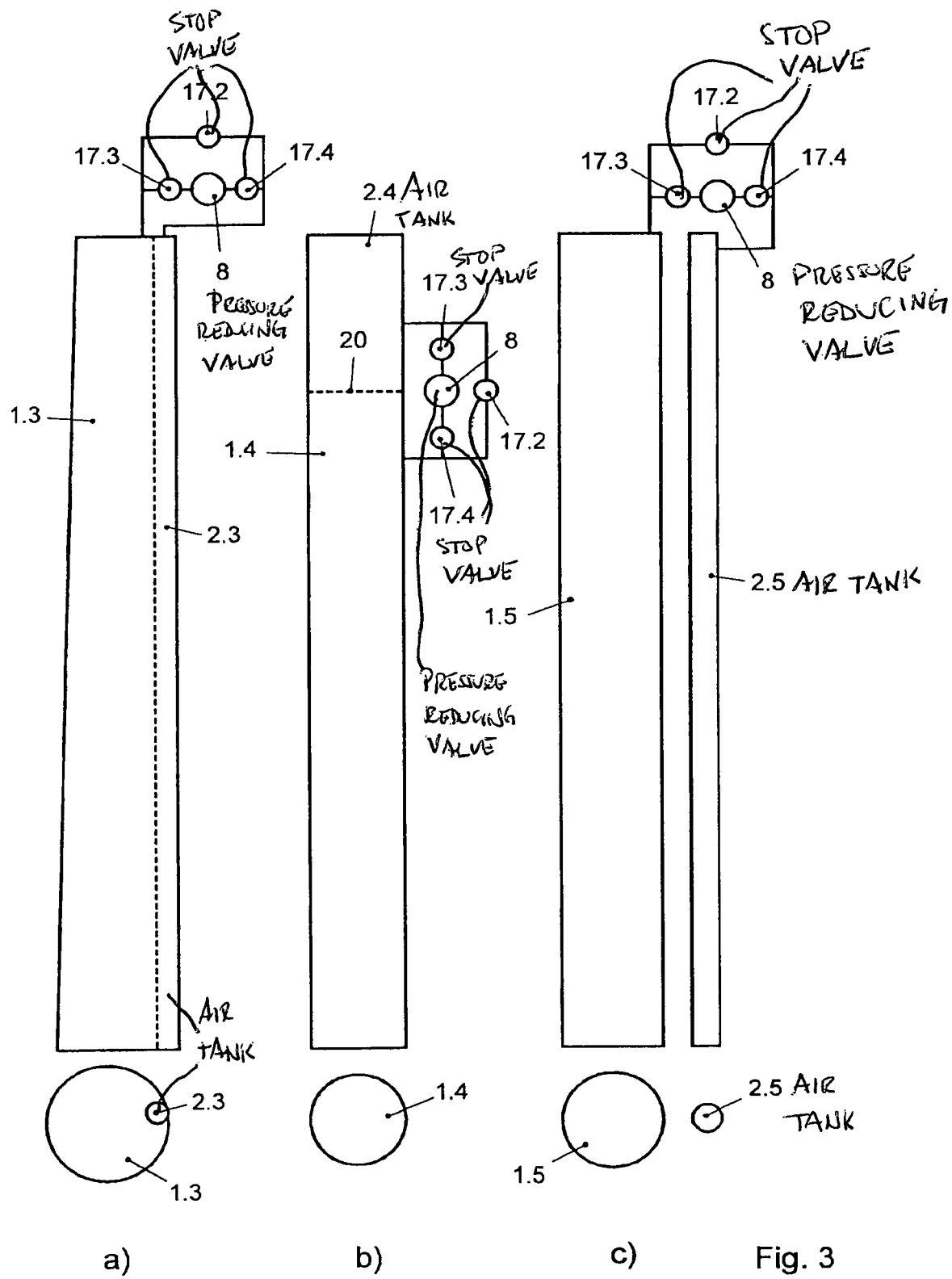
FIGS. 3a to 3c show schematic illustrations of three variants of placing compressed air vessels.

In FIG. 3*a* the smaller compressed air vessel 2.3 is installed in the large pressurized water vessel 1.3.

In FIG. 3*b* a pressure-tight and sealed intermediate wall 20 is installed in a pressurized water vessel 1.4. The larger compartment forms the pressurized water vessel 1.4, and the smaller compartment forms the compressed air vessel 2.4.

In FIG. 3*c* the compressed air vessel 2.5 is placed outside the pressurized water vessel 1.5.

Figure 4:
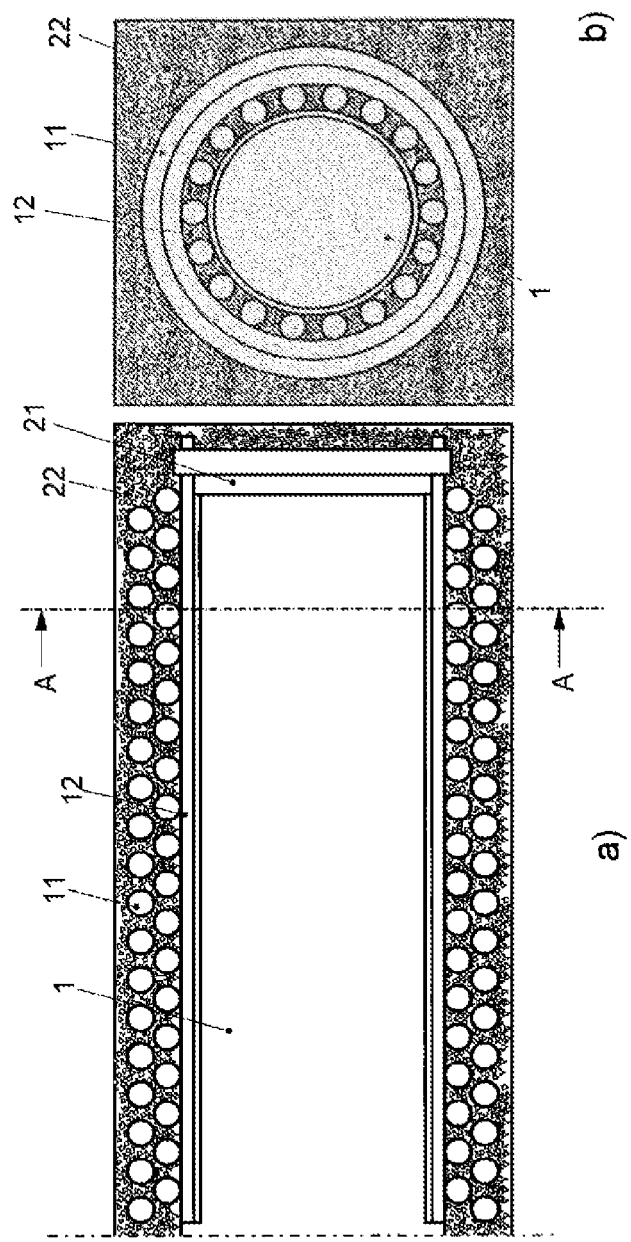
FIGS. 4a and b shows a partially illustrated longitudinal section and a cross section along the line A-A through a thin-walled pipe as a pressurized water vessel.

According to FIG. 4 it is illustrated how a thin-walled pipe as a pressurized water vessel 1 may be rendered so as to be high-pressure tight, using a steel reinforced concrete jacket. Reinforcement steel 11 is helically wound and pushed over the pipe in one or a plurality of layers, depending on the pressure tightness required. The radial pressure presses are absorbed by this pipe coiling with reinforcement steel. In order for the axial pressure presses to be supported, reinforcement steel bars 12 are disposed in an annular manner around the pipe and fixedly welded to pipe terminal plates 21. The entire assembly is encircled by a casing and filled with high-pressure-tight concrete 22 and vibrated such that no cavities remain.

Figure 5:
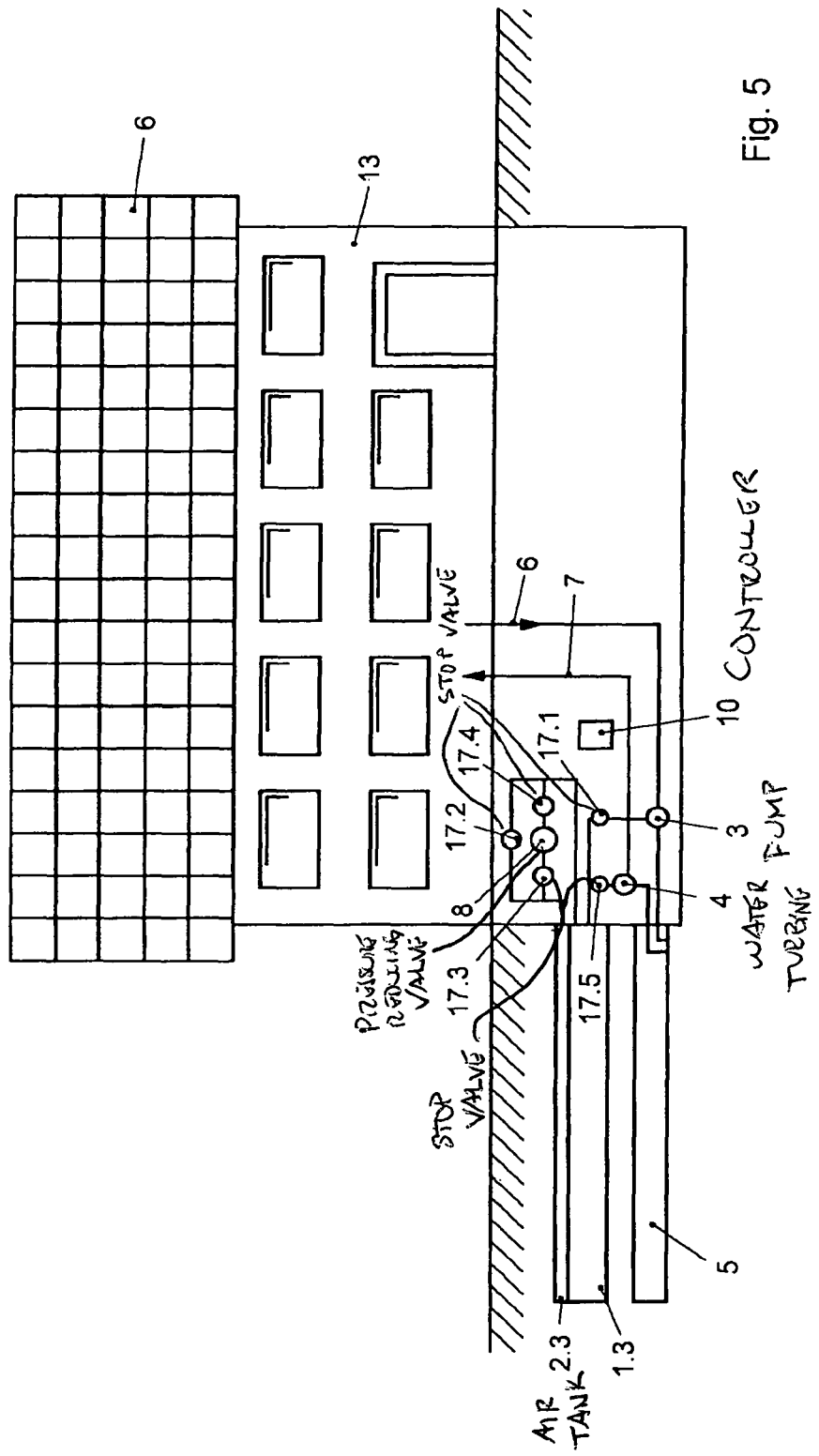
FIG. 5 shows a schematic illustration according to the invention of energy storage for a duplex house having a roof solar system.

FIG. 5 shows an energy storage system for a duplex house 13, having a roof solar system 6 with pressurized storage pipes which are concrete-sheathed in the ground outside the house, on account of which very little space is required in the basement. The figure furthermore shows a pressurized water vessel 1.3 which is placed in the ground and has an integrated compressed air store 2.3. The pressureless reserve vessel 5 is located under the pressurized water store 1.3, having a connection to the high-pressure water pump 3 for filling the storage vessel 1.3 and to the turbine generator 4 for the return flow of water of the energy recuperated in the turbine from the pressurized water vessel. The overpressure protection devices and an automatic operation system 10, which are computer-controlled and process-controlled, are only schematically indicated. Note that operation system or controller 10 is also schematically illustrated in FIG. 1 along with broken line connections illustrating computer and process control of various components of the system.

Figure 6:
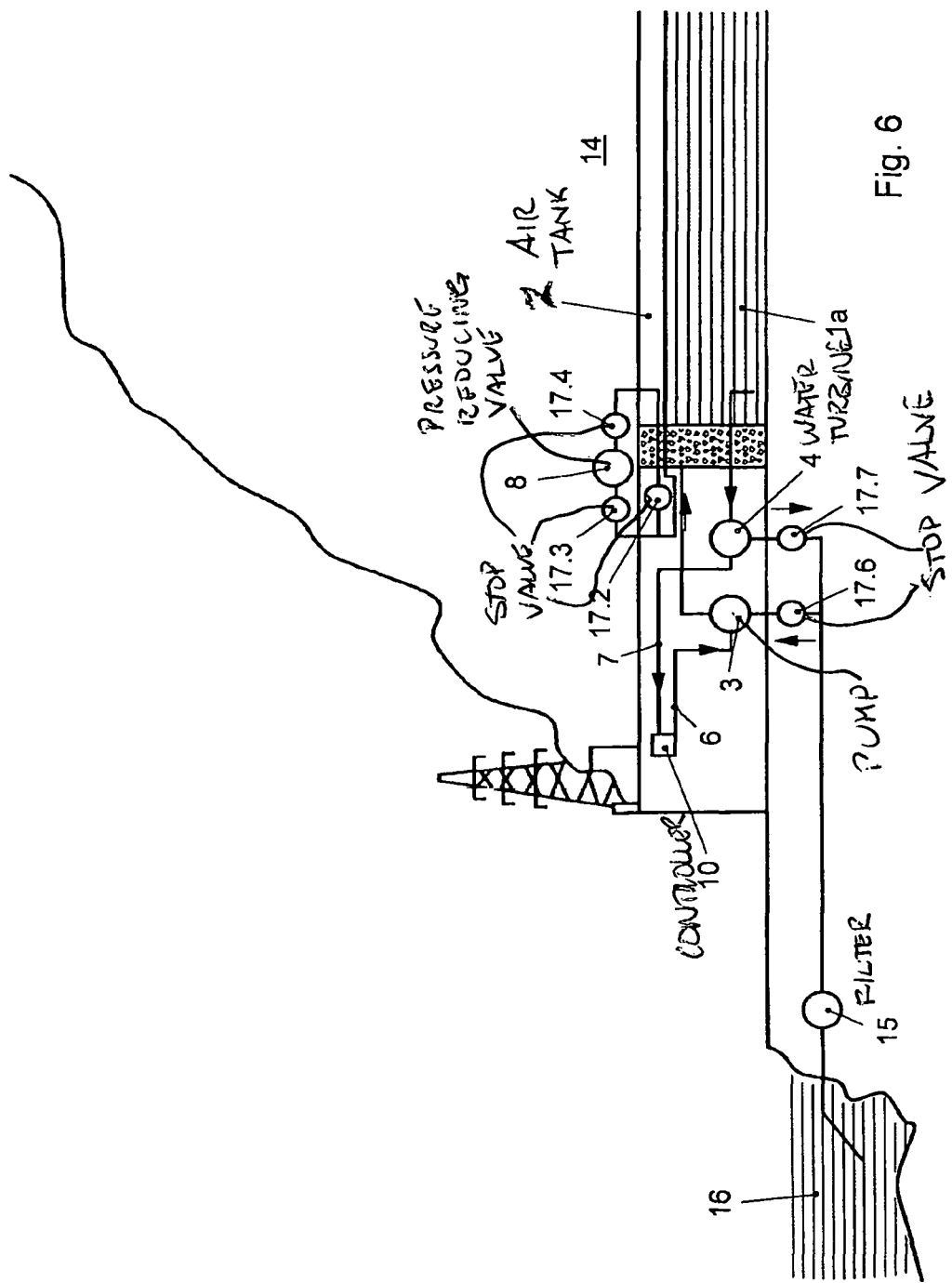
FIG. 6 shows a schematic illustration according to the invention of a large energy storage system in a rock tunnel, adjacent to a lake or a reservoir.

FIG. 6 shows a large energy storage system in a rock tunnel 14, adjacent to a lake 16. The water supply to the high-pressure water pump 3 is equipped with a filter 15 which is repeatedly cleaned by the water flowing back from the power-generating turbine generator 4.

The inflow and outflow of the storage water is regulated by two valves 17.6 and 17.7. The incoming power line in an alternating manner supplies excess power for feeding the high-pressure water pumps 3, or in the case of a lack of power is fed by the stored high-pressure water energy by way of relaxation in the power-generating turbine generator 4. The overpressure safety devices and the automatic operating system 10 are computer-controlled and process-controlled.

Figure 7:
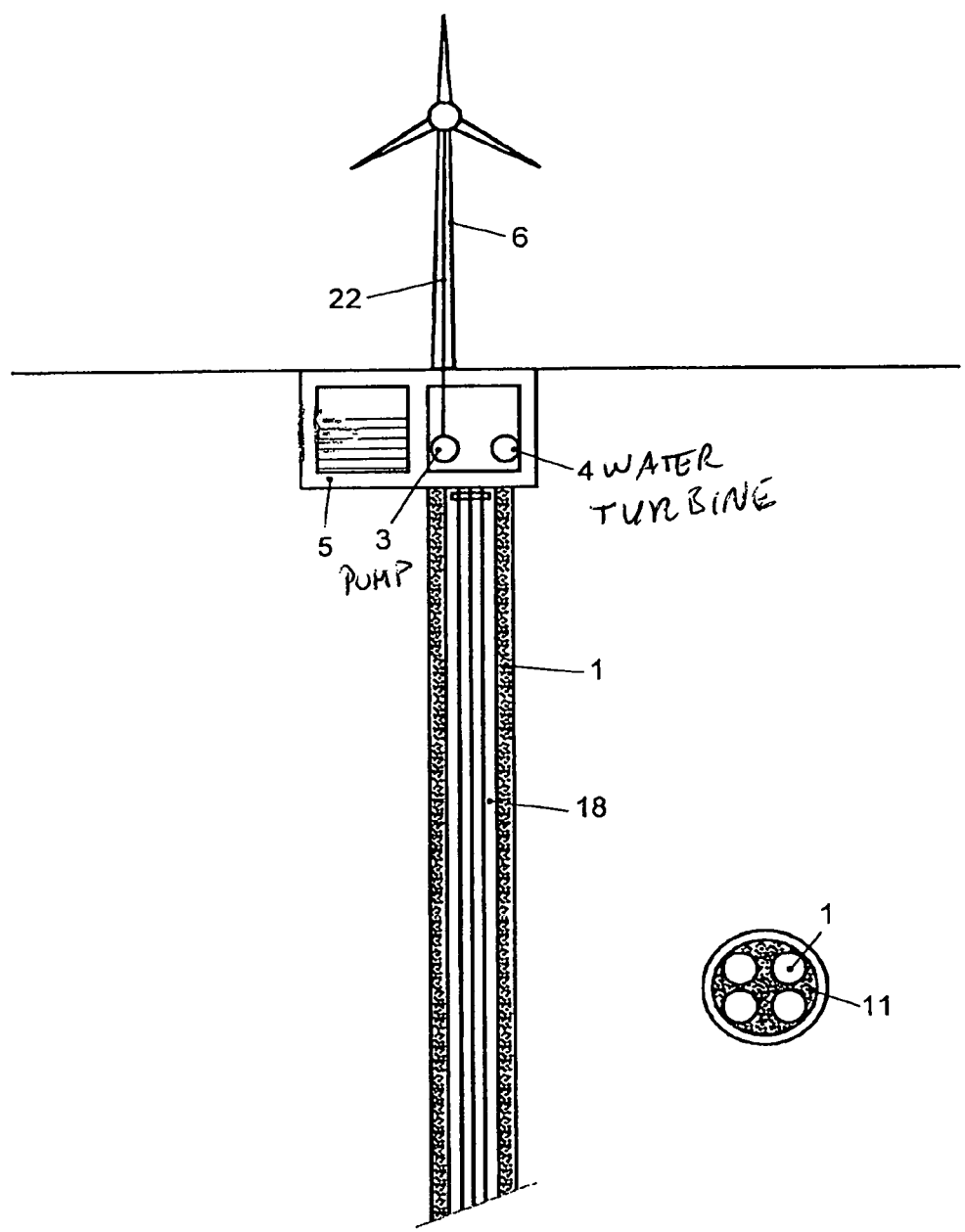
FIG. 7 shows a schematic illustration according to the invention of wind power energy storage using pipeline pipes or concrete-sheathed storage pipes, placed vertically in a bore hole.

FIG. 7 shows a schematic illustration according to the invention of energy storage using pipeline pipes or concrete-sheathed storage pipes 18, placed in a vertical manner in a bore hole. The wind power system 6 here preferably sits directly on the unit composed of the pressurized water vessel or the reserve vessel 5, respectively, and the housing for the water pump 3 and the turbine 4. On account thereof, a dedicated foundation for the wind power system 6 can be saved. Moreover, on account thereof, the wind power system 6 is very well anchored in the ground.

Furthermore, at 22 it is illustrated here that the wind power system 6 is connected directly to the water pump 3. To this end, an angular gear (not shown in more detail) is preferably provided.

Figure 8:
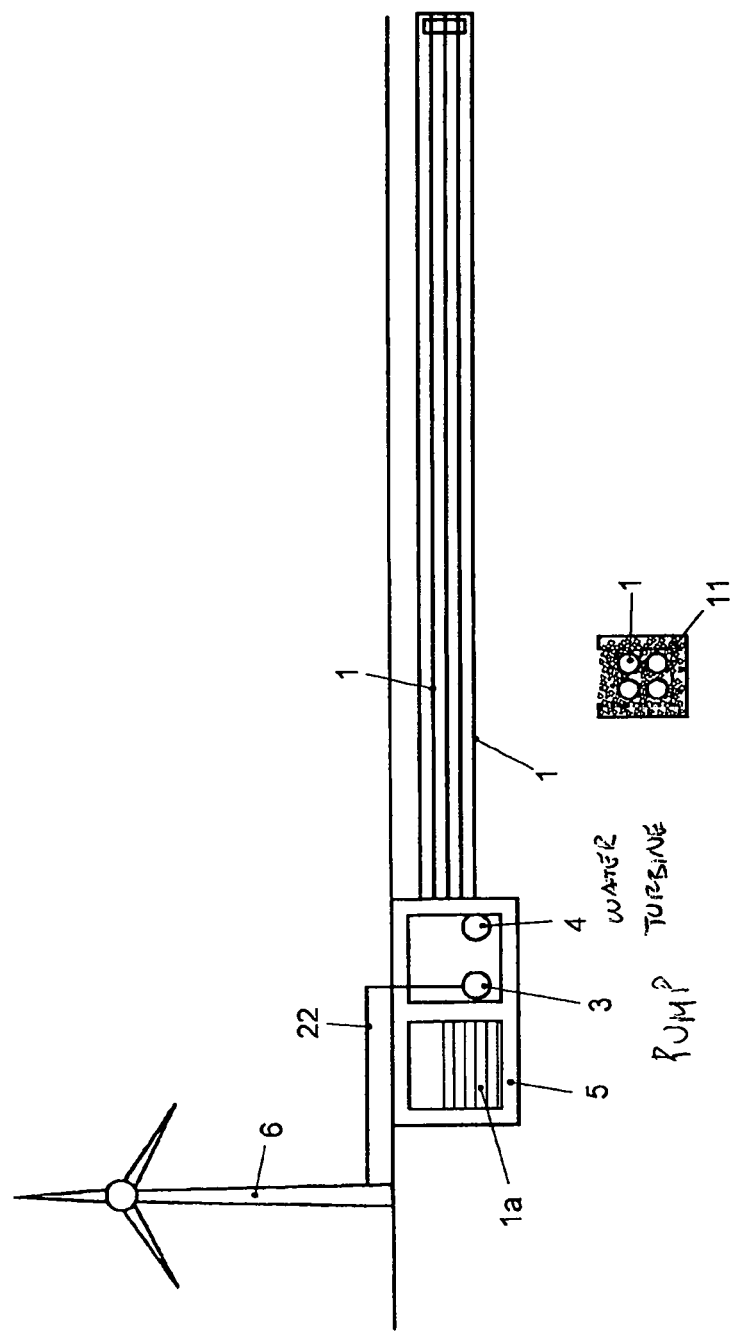
FIG. 8 shows a schematic illustration according to the invention of wind power energy storage using pipeline pipes or high-pressure-tight and concrete-sheathed pressurized water vessel pipes which are horizontally installed in the ground.

FIG. 8 shows a schematic illustration according to the invention of energy storage using pipeline pipes or high-pressure-tight and concrete-sheathed pressurized water vessel pipes which are horizontally installed in the ground. The drawing likewise shows a single wind turbine having direct drive of the water high-pressure pump by way of the propeller. The concrete substructure having the pump and the water tank simultaneously serves as the foundation for the wind turbine tower. The hollow space of the tower may be utilized as a pressure-tight hollow space for pump water pressure—compressed air energy storage.

Of course it is also conceivable in the context of the invention to not only connect one propeller but the propellers of an entire wind farm to an energy recuperation system according to the invention.

The invention claimed is:

1. A system for combined pump water pressure-compressed gas energy storage at constant turbine water pressure, comprising:
   a pressurized liquid medium vessel;
   a compressed-gas vessel, the pressurized liquid medium vessel being connected to the compressed-gas vessel through a connection line, and further comprising a stop valve along the connection line;
   a high pressure water pump disposed upstream of the pressurized liquid medium vessel;
   wherein the high pressure water pump pumps a liquid medium into the pressurized liquid medium vessel, wherein an increasing liquid medium level compresses gas located in the pressurized liquid medium vessel in a piston-like manner until the liquid medium fills the pressurized liquid medium vessel and presses the gas through the connection line into the compressed-gas vessel;
   and wherein the stop valve shuts off flow of the gas out of the compressed-gas vessel through the connection line whereby energy is stored in the gas;
   further comprising a second connection line connecting the compressed-gas vessel to the pressurized liquid medium vessel, and a gas-pressure reducing valve along the second connection line which reduces pressure of compressed gas from the compressed-gas vessel introduced into the pressurized liquid medium vessel and thereby maintains liquid medium pressure for driving a turbine at a constant pressure level of an operating pressure set in the gas-pressure reducing valve;

wherein the compressed-gas vessel has a volume that is smaller than the pressurized liquid medium vessel, and wherein the compressed-gas vessel and the pressurized liquid medium vessel are defined by a sealed and pressure-tight separation wall in a tubular storage vessel;

further comprising a helical steel reinforcement on the tubular storage vessel for damping radial pressure; and further comprising terminal plates at pipe terminals of the tubular storage vessel, and wherein reinforcement steel bars connect the terminal plates along a length of the tubular storage vessel for absorbing axial force.

2. The system according to claim 1, wherein storage liquid in the pressurized liquid medium vessel comprises water.

3. The system according to claim 1, wherein two or more storage systems having a common water reservoir are provided for alternating energy storage and energy recuperation operation.

4. The system according to claim 3, wherein the system is arranged and configured such that, during energy storing, the pressurized liquid medium vessel requires the liquid medium, and during use of energy, the pressurized liquid medium vessel discharges the liquid medium.

5. The system according to claim 1, further comprising a liquid medium supply which feeds liquid medium to the pressurized liquid medium vessel from above and in a distributing manner, wherein the liquid medium trickles through gas being heated, cooling the liquid medium.

6. The system according to claim 5, wherein the liquid medium is delivered in a scattered manner into a gas space of the pressurized liquid medium vessel.

7. The system according to claim 1, wherein heat created by compression of gas is absorbed by the liquid medium and serves for equalizing cooling energy which is created by a reduction of pressure in the reducing valve.

8. The system according to claim 1, wherein the high pressure water pump by way of a respective connection is connected to a wind power system.

9. The system according to claim 8, wherein an angular gear is interdisposed in the respective connection.

* * * * *